J. W. PELLETREAU.
Potato-Planter.
No. 19,869.
Patented Apr. 6, 1858.
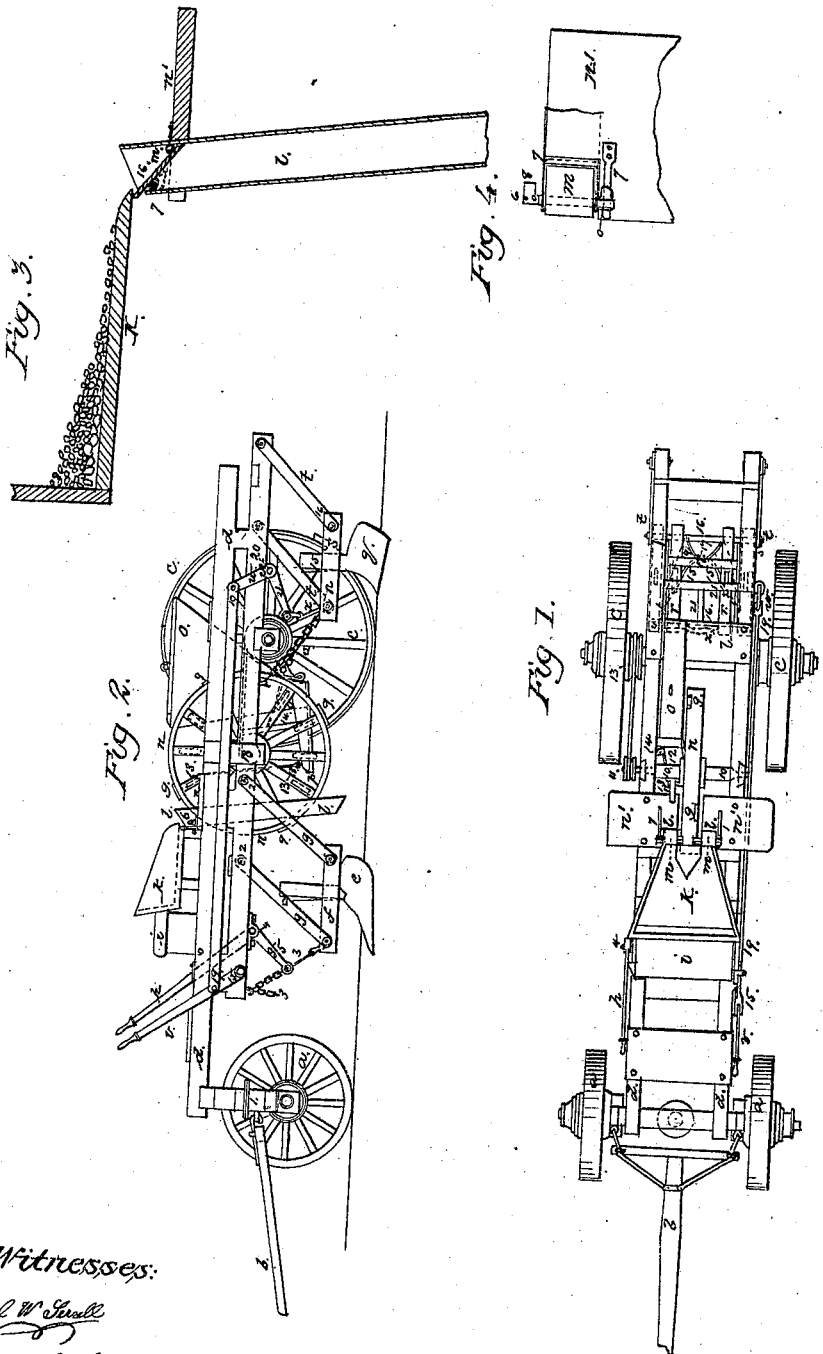
Witnesses:
Lemuel W. Serrell
Thomas G. Harold
Inventor:
J. W. Pelletreau

UNITED STATES PATENT OFFICE.

JESSE W. PELLETREAU, OF EAST MORICHES, NEW YORK.

IMPROVEMENT IN MACHINES FOR PLANTING POTATOES.

Specification forming part of Letters Patent No. 19,869, dated April 6, 1858.

*To all whom it may concern:*

Be it known that I, JESSE W. PELLETREAU, of East Moriches, in the county of Suffolk and State of New York, have invented, made, and applied to use certain new and useful Improvements in Potato-Planters; and I do hereby declare that the following is a full, clear, and exact description of the construction and operation of the same, reference being had to the annexed drawings, making part of this specification, wherein—

Figure 1 is a plan of my machine complete. Fig. 2 is a side elevation of the same, as with the wheels on the near side removed to show the parts. Fig. 3 is a vertical section, and Fig. 4 a plan, of the spout and its clapper for dropping the pieces or potatoes.

Similar marks of reference indicate similar parts.

In planting potatoes difficulty has heretofore existed to devise machinery that would act on the separate pieces of potato reliably, because said pieces are of such various sizes and shapes, and often whole potatoes are planted. Hence potatoes are now generally planted in a furrow opened by a plow, the pieces being dropped by hand, then followed by a sprinkling of manure, and finally covered by passing over the field again with a plow, making a very laborious and tedious operation.

The nature of my said invention consists in the general arrangement of a hopper, (containing the potatoes or pieces cut ready for planting,) an automatic dropping apparatus, and opening and covering plows $e$ and $q\ q$, arranged in such a manner that the potatoes or pieces of potato are dropped at regular distances into the furrow, the same being supplied to the automatic dropping apparatus by hand, thereby insuring that the field is planted in a more uniform manner than by any machine with which I am acquainted, because the potatoes or pieces of potato are not injured by the machinery, and because I combine all the advantages of hand-planting with automatic distribution, and relieve the farmer of the laborious work of hand-planting by a cheap and easily constructed and repaired machine, and one that proves itself practically to be better than hand-planting, which has heretofore been considered the best, except from considerations of the arduous bodily labor connected therewith.

In the drawings, $a\ a$ are the front wheels of the apparatus, set so as to turn on the fifth-wheels 1, around beneath the body of the apparatus, to make short turns at the ends of the furrows.

$b$ is the pole to which the animals are attached.

$c\ c$ are the hind wheels, attached to and supporting the frame-work $d$.

$e$ is a double-mold-board plow on a vertical stock that passes through the beam $f$, and is adjusted to pass into the ground the desired distance, and secured in place by a wedge. Through the ends of the beam $f$, I pass cross-bars that are connected to the lower ends of parallel-motion bars $g\ g$, attached at 2 to the frame $d$, the forward pair sitting inside the said frame, and the rear pair being attached on the outside, so as to steady said plow laterally.

3 is the drag-chain, hooked to the frame, of the proper length to allow the plow to descend correctly into the earth.

$h$ is a lever to a cross-shaft, 4, on which is a crank-arm, 5, to about the middle of the chain 3. The driver, sitting on the seat $i$, can by this means elevate the plow $e$ on turning around the headlands or in going to the field.

$k$ is a hopper containing the potatoes or pieces of potato to be planted.

$l\ l$ are spouts conveying the pieces of potato to the furrow. These spouts are sufficiently close together to cause the said pieces of potato to fall into the furrow, and are inclined slightly to the rear. In the upper end of each of these spouts $l$ is a trap or clapper, $m$, on a spindle, 6.

7 is a spring to keep the clapper up in place. 8 is a projection from the other end, acted on by blocks 9 9 on the wheel $n$, which wheel is mounted on a shaft, 10, and provided with a pulley, 11, receiving motion by a band from a pulley, 12, on the hub of wheel $c$. The position of these blocks 9 on the wheel $n$ is to be such that one will strike the projection 8 of one of the clappers every time the machine moves the distance required between the pieces of potato planted. The operation of this part therefore is as follows: Two boys (or similar helps) are seated on the seats $n$ 1, and drop pieces of potato into the spouts l l, and the same rest on the clappers m m, and said pieces are alternately dropped through the spouts at the proper time by the projections 9 striking on the projections 8 of the clappers as the wheel n revolves, and as soon as each clapper m comes up into place by the spring 7 another potato or piece is dropped thereon by the attendant, ready to fall through the spout into the furrow when the clapper is turned down again. Where two spouts and two attendants are made use of, the blocks or projections 9 require to be on alternate sides of the rim of the wheel n; but where the potatoes are required to be planted a considerable distance apart only one spout and one attendant may be made use of, and the projections g may be made adjustable, to suit different characters of planting, in any convenient manner.

In order to sprinkle the manure along in the furrow, I make use of a box or hopper, o, at the bottom of which is a shoe, p, fitted to be adjusted to different inclinations, by the strap 13, to deposit more or less guano or other manure; and the shoe p is kept toward the wheel n by a long wood spring, 14, or similar device, and the end of the hopper is beveled off, so as to come in contact with projections on the spokes of the wheel n, and receive from them a sidewise shaking motion to deposit the fertilizer in the furrow. The projections on the arms or spokes of the wheel n are shown by dotted lines in Fig. 2.

To cover the cut or uncut potatoes and the manure I make use of a double plow, q. Each mold-board is on a vertical stock, 15, passing through a mortise in the longitudinal bars r, and there secured by a wedge.

s is a frame supported by parallel-motion bars t from the frame d, similar to the bars g, and said frame s is connected by cross-bolts 16, on which the bars r are sustained, so that the bars r can be adjusted transversely of the machine to regulate the distance apart of the mold-boards q q.

17 is a cross-piece between the frame s, with holes to receive pins, holding the bars r in the position to which they may be adjusted. In case considerable distance is required between the mold-boards q, their shanks or stocks 15 may be passed through mortises in the frame s.

u is the drag-chain to the covering-plow, hooked to the frame at the desired point.

v is a lever on a fulcrum, 18, with a connecting-rod, 19, to a crank-arm, w, on a shaft, 20.

21 is an arm to the yoke-piece x, by which the covering-plow can be elevated, when necessary.

The distance between the wheels of each pair should be the same as that between each furrow or row of potatoes, (say three feet, more or less,) and the driver proceeds in a straight line until one row is plowed, planted, manured, and covered, as described. He then turns his horses around and drives along with the one hind wheel on the same line as it came. Of course in running around the headland he first lifts the plow c, and afterward lifts the covering-plow g, the assistants ceasing the supply of potatoes and then commencing the same at the proper times.

By the adjustment of the mold-boards q q, both horizontally and vertically, the potatoes are buried to a greater or less depth.

What I claim as my invention, and desire to secure by Letters Patent, is—

The general arrangement of the hopper k and automatic dropping apparatus, consisting of the spouts l, clappers m, wheel n, and blocks 9 9, in connection with the opening and covering plows, substantially as specified, whereby the potatoes or pieces of potato being fed into the machine by hand are not injured, and all the advantages of hand-planting are attained without the laborious work connected therewith, as specified.

In witness whereof I have hereunto set my signature this 5th day of June, 1857.

J. W. PELLETREAU.

Witnesses:
  LEMUEL W. SERRELL,
  THOMAS G. HAROLD.